United States Patent [19]

Kimura et al.

[11] Patent Number: 5,872,172
[45] Date of Patent: Feb. 16, 1999

[54] METHODS FOR THE PREPARATION OF LIQUID SILICONE RUBBER BASE AND LIQUID SILICONE RUBBER COMPOSITION

[75] Inventors: Kenichi Kimura; Mutsuo Shimizu, both of Annaka, Japan

[73] Assignee: Shin-Etsu Chemical Co., Ltd., Tokyo, Japan

[21] Appl. No.: 986,127

[22] Filed: Dec. 5, 1997

[30] Foreign Application Priority Data

Dec. 9, 1996 [JP] Japan ................................. 8-344595

[51] Int. Cl.$^6$ ....................................................... C08K 3/34
[52] U.S. Cl. ........................ 524/493; 528/502 F; 528/15; 528/32; 524/588; 525/478; 525/479
[58] Field of Search .................................. 528/502 F, 32, 528/15; 524/588, 493, 188, 428, 265; 525/479, 478; 523/212

[56] References Cited

U.S. PATENT DOCUMENTS

| | | |
|---|---|---|
| 4,528,311 | 7/1985 | Beard et al. . |
| 4,851,173 | 7/1989 | Mackley et al. ...................... 528/502 F |
| 5,051,129 | 9/1991 | Cuthbert et al. . |
| 5,480,722 | 1/1996 | Tomonaga et al. . |
| 5,629,400 | 5/1997 | Standke et al. . |
| 5,679,147 | 10/1997 | Standke et al. . |

FOREIGN PATENT DOCUMENTS

| | | |
|---|---|---|
| 671 450 | 9/1995 | European Pat. Off. . |
| 675 128 | 10/1995 | European Pat. Off. . |
| 716 127 | 6/1996 | European Pat. Off. . |
| 716 128 | 6/1996 | European Pat. Off. . |
| 738 771 | 10/1996 | European Pat. Off. . |
| 761 675 | 3/1997 | European Pat. Off. . |
| 61130344 | 6/1986 | Japan . |
| 63270763 | 11/1988 | Japan . |
| 428008 | 5/1992 | Japan . |
| 7238228 | 9/1995 | Japan . |
| 97/15700 | 5/1997 | WIPO . |

OTHER PUBLICATIONS

JP–A 63270763 (English abstract) (Nov. 8, 1988).
JP–A 61130344 (English abstract) (Jun. 18, 1986).

*Primary Examiner*—Melvyn I. Marquis
*Attorney, Agent, or Firm*—Millen, White, Zelano, & Branigan, P.C.

[57] ABSTRACT

A liquid silicone rubber base is prepared by mixing an organopolysiloxane containing at least two alkenyl groups, reinforcing silica having a BET specific surface area of at least 50 m$^2$/g, and optionally, a mixing assistant. The mixing step includes a first stage of mixing under a first shear stress of at least 1×10$^6$ N/m$^2$ for 1–5 minutes and a second stage of mixing under a second shear stress which is up to ½ of the first shear stress for at least 2 minutes. The silicone rubber base is sufficiently shelf stable to minimize a viscosity rise with time.

12 Claims, No Drawings

МETHODS FOR THE PREPARATION OF LIQUID SILICONE RUBBER BASE AND LIQUID SILICONE RUBBER COMPOSITION

BACKGROUND OF THE INVENTION

1. Field of the Invention

This invention relates to a method for preparing a liquid silicone rubber base useful as a source of silicone rubber and a method for preparing a liquid silicone rubber composition therefrom.

2. Prior Art

In the current silicone rubber market, liquid silicone rubber compositions enjoy an increasing share since they are smoothly flowing, readily applicable through injection molding machines and amenable to automatic processing. Among others, addition curing type liquid silicone rubber compositions based on alkenyl group-containing organopolysiloxane are on widespread use. Their preparation methods are generally designed so as to increase the manufacturing yield and accommodate for the manufacture of various types of products. Typically, a liquid silicone rubber base is once prepared as a common intermediate before a particular silicone rubber composition is prepared by blending the base with an appropriate curing agent and other ingredients.

The liquid silicone rubber base is generally prepared by blending an alkenyl-containing organopolysiloxane as a base component with a large amount of reinforcing silica filler. In JP-B 28737/1993, for example, a silicone rubber composition for injection-molding is prepared by blending 100 parts by weight of organopolysiloxane with up to 300 parts by weight of a filler as typified by finely divided silica.

However, when a large amount of reinforcing silica filler is blended to form a liquid silicone rubber base from which a liquid silicone rubber composition is prepared, no products having stable physical properties are obtained unless the silica filler is previously sufficiently surface treated or the silica filler is heat treated at relatively high temperature for a long time in the presence of a surface treating agent. JP-A 238228/1995, for example, discloses the addition of hexamethyldisilazane and heat treatment at room temperature for 1 hour and then at a temperature of 100° to 250° C. for at least 2 hours for restraining a viscosity increase with the lapse of time and imparting satisfactory shelf stability. Also JP-A 130344/1986 discloses heating/mixing treatment at 150° C. for 2 to 3 hours. In either case, the processing time taken from the mixing of silicone oil as a base component with an inorganic filler to the completion of a base polymer is crucial. Heavy kneading or long-term heat treatment must be carried out to increase the rubber strength of the resulting liquid silicone rubber base polymer. A further long time is required in larger scale mass manufacturing plants.

Active research works have recently been made on the continuous process which generally relies on kneading operation using a continuous kneading machine including a single or twin screw extruder. In the continuous kneading machine, a certain limit is imposed on the ratio of the shaft length to the screw diameter since kneading operation is carried out while applying significant shear rates by high speed rotation. The residence time in the continuous kneading machine is naturally limited and generally as short as several tens of seconds to several minutes. Accordingly, a sufficient processing time is not ensured. As a result, the liquid silicone rubber base undergoes a viscosity increase and loses shelf stability. A liquid silicone rubber composition prepared from the base suffers from losses of basic rubber properties such as elongation and tensile strength and losses of fatigue endurance due to insufficient dispersion of the filler.

JP-B 28008/1992 discloses an attempt of heating a mixing section of a twin screw extrusion mixer at 200° to 300° C., thereby processing liquid silicone rubber base at a higher temperature to compensate for a shortage of processing time. Although this improves the rubber strength (tensile strength and elongation) of the resulting liquid silicone rubber composition, problems still remain with respect to viscosity and shelf stability. The liquid silicone rubber base and a liquid silicone rubber composition prepared from the base experience a change of flow with time. It is difficult to obtain a liquid silicone rubber base of stabilized quality.

SUMMARY OF THE INVENTION

An object of the invention is to provide a method for briefly preparing a liquid silicone rubber base which is sufficiently shelf stable to minimize a viscosity rise during shelf storage. Another object of the invention is to provide a method for preparing a liquid silicone rubber composition from the liquid silicone rubber base.

According to the invention, a liquid silicone rubber base is prepared by mixing an organopolysiloxane containing at least two alkenyl groups attached to a silicon atom in a molecule and having a viscosity of 100 to 300,000 centistokes at 25° C., a reinforcing silica filler having a specific surface area of at least 50 $m^2/g$ as measured by the BET method, and optionally, a mixing assistant for facilitating the mixing of the organopolysiloxane with the reinforcing silica filler. We have found that when a first stage of mixing is carried out under a first shear stress of at least $1\times10^6$ $N/m^2$ and a second stage of mixing carried out under a second shear stress which is up to ½ of the first shear stress, there is obtained a liquid silicone rubber base which is sufficiently shelf stable to minimize a viscosity rise during shelf storage. A liquid silicone rubber composition can be prepared from the liquid silicone rubber base.

Specifically, the present invention provides a method for preparing a liquid silicone rubber base by mixing an organopolysiloxane containing at least two alkenyl groups attached to a silicon atom in a molecule and having a viscosity of 100 to 300,000 centistokes at 25° C., reinforcing silica having a specific surface area of at least 50 $m^2/g$ as measured by the BET method, and optionally, a mixing assistant, wherein the mixing step includes a first stage of mixing under a first shear stress of at least $1\times10^6$ $N/m^2$ and a second stage of mixing under a second shear stress which is up to ½ of the first shear stress. Preferably heat treatment is carried out concurrent with the first and second stages of mixing. Specifically, the first stage of mixing is partially carried out at a temperature of 150° to 300° C., and the second stage of mixing is partially or entirely carried out at a temperature of 150° to 300° C. In a further preferred embodiment, the first stage of mixing continues for less than 5 minutes, the second stage of mixing continues for at least 2 minutes, and the overall mixing time of the first and second stages is at least 2.5 minutes. The first and second stages of mixing are successively and continuously carried out through two serially connected extrusion mixers. Differently stated, the residence time in the first mixer is less than 5 minutes and the residence time in the second mixer is at least 2 minutes. Then a liquid silicone rubber base having superior shelf stability in that the viscosity rise after shelf storage is minimized can be prepared within a relatively short time.

The present invention also provides a method for preparing a liquid silicone rubber composition by blending the liquid silicone rubber base with an organohydrogenpolysiloxane and an addition reaction catalyst. The composition exhibits superior cured properties.

DETAILED DESCRIPTION OF THE INVENTION

The liquid silicone rubber base and the liquid silicone rubber composition according to the invention contain an organopolysiloxane as a base component. The organopolysiloxane should contain at least two alkenyl groups attached to a silicon atom in a molecule and have a viscosity of 100 to 300,000 centistokes at 25° C. The preferred organopolysiloxane is of the following average compositional formula (1).

$$R_a SiO_{(4-a)/2} \tag{1}$$

In formula (1), R is selected from substituted or unsubstituted monovalent hydrocarbon groups of 1 to 12 carbon atoms, especially 1 to 8 carbon atoms attached to a silicon atom, for example, alkyl groups such as methyl, ethyl, propyl, isopropyl, butyl, pentyl, and hexyl; cycloalkyl groups such as cyclopentyl, cyclohexyl, and cycloheptyl; alkenyl groups such as vinyl and allyl; aryl groups such as phenyl, tolyl, naphthyl and biphenyl; aralkyl groups such as benzyl; and substituted ones of these groups wherein some or all of the hydrogen atoms are replaced by halogen atoms or cyano groups. At least two R groups are alkenyl groups. Letter a is a positive number of 1.8 to 2.2. The structure of the organopolysiloxane is preferably linear and has an alkenyl group at an end of its molecular chain although a branched structure may be partially included.

Silica powder having a specific surface area of at least 50 m²/g as measured by the BET method is used as a reinforcing filler. Exemplary silica fillers are fumed silica, precipitated silica and hydrophobic silica. These fillers may be used alone or in admixture of two or more. Also useful is modified silica powder obtained by incorporating silicone oil into silica powder to increase a bulk density. Silica may have been treated with surface treating agents such as hexamethyldisilazane, trimethylsilanol, dimethylsilanol, trimethylsilane, dimethylsilane, and relatively short chain siloxane having a terminal silanol group. The reinforcing silica filler is preferably blended in an amount of about 5 to 150 parts, especially about 20 to 100 parts by weight per 100 parts by weight of the organopolysiloxane.

If necessary, a mixing assistant is blended for facilitating the mixing of the organopolysiloxane with the reinforcing silica filler. The mixing assistant is a liquid substance and preferably selected from hexamethyldisilazane, compounds of the following formula (2), aqueous ammonia, and mixtures thereof.

$$\begin{array}{c} R^1 \\ | \\ R^1SiOH \\ | \\ R^1 \end{array} \tag{2}$$

In formula (2), $R^1$ is a monovalent hydrocarbon group as defined for R, typically methyl and vinyl, or a triorganosiloxy group such as trimethylsiloxy.

A liquid silicone rubber base is prepared by mixing the organopolysiloxane containing at least two alkenyl groups attached to a silicon atom in a molecule, the reinforcing silica filler having a BET specific surface area of at least 50 m²/g, and optionally, the mixing assistant for facilitating the mixing of the organopolysiloxane with the filler, all as defined above. According to the invention, a relatively high shear stress type mixer is used in a first stage whereby mixing is carried out under a first shear stress of at least $1\times10^6$ N/m². High shear stress mixing is effective for imparting basic rubber strength such as tensile strength and elongation to the silicone rubber. A first shear stress of less than $1\times10^6$ N/m² achieves insufficient mixing and dispersion of the organopolysiloxane and silica filler, failing to ensure basic rubber strength such as tensile strength and elongation.

The first stage of mixing is mainly intended to establish rubber strength and thus requires application of relatively high shear stresses. The kneader or mixer used in the first stage of mixing may be any of mixers capable of mixing under a high shear stress of at least $1\times10^6$ N/m². In general, single, twin and multi-screw continuous extrusion kneaders are useful. Commercially available exemplary mixers are a KRC kneader by Kurimoto Iron Works K.K., a TEM twin-screw mixing extruder by Toshiba Machinery K.K., and a KCK continuous mixing extruder by KCK K.K.

A relatively low shear stress type mixer is serially connected to the mixer of the first stage whereby a second stage of mixing is successively carried out under a second shear stress which is up to ½ of the first shear stress, for achieving ripening of the mixture. The resulting liquid silicone rubber base is sufficiently shelf stable to minimize a viscosity rise during shelf storage. The liquid silicone rubber base is ready for the preparation of a liquid silicone rubber composition therefrom. While the first stage mixer carries out mixing at a high shear stress and high shear rate and thus makes no contribution to shelf stability, the second stage of mixing is mainly intended to insure a ripening time necessary for improving shelf stability, preferably a processing time with concomitant heating. In this regard, an unnecessarily high shear stress is inadequate for the second stage of mixing from the standpoints of energy and residence time. If a mixer capable of mixing under an equivalent shear stress to the first stage mixer is used in the second stage, the second stage mixer must be an uneconomical large one.

The second stage mixer connected to the first stage mixer may be any of mixers capable of mixing under a lower shear stress. Since the second stage of mixing is intended to ensure that the liquid silicone rubber base is shelf stable so as to prevent the base from increasing its viscosity with the lapse of time, a certain residence time must be secured rather than the shear stress. Although it is fully acceptable for the second stage mixer to reduce the revolution of a rotating blade (e.g., screw and paddle) for lowering the shear rate and shear stress, the second stage mixer should desirably have a residence time of at least 2 minutes. Additionally, the mixing section of the second stage mixer should preferably be heated.

In the practice of the invention, the first and second stage mixers preferably carry out heat treatment concurrently with mixing for a part of the first stage of mixing and for a part or the entirety of the second stage of mixing. The heat treatment is preferably at a temperature of 150° to 300° C., more preferably 200° to 300° C. A heat treatment temperature of lower than 150° C. would be less effective for briefly rendering hydrophobic the reinforcing silica filler containing many silanol groups which can cause a viscosity rise with time. A heat treatment temperature of higher than 300° C. can deteriorate the organopolysiloxane or base component and, more particularly, cause the liberation of alkenyl groups from silicon atoms in its molecule and the scission of the polymer backbone chain. Then temperatures in the range of 150° to 300° C. are appropriate for ensuring shelf stability to the liquid silicone rubber base.

Desirably, an initial mixing portion of the first stage of mixing immediately after the blending of the components is maintained at a relatively low temperature of lower than 60° C.

In one preferred embodiment of the invention, the first stage of mixing continues for less than 5 minutes, the second stage of mixing continues for at least 2 minutes, and the overall mixing time of the first and second stages is at least 2.5 minutes, especially 10 to 30 minutes. In the embodiment wherein two serially connected extrusion mixers are used, the residence time in the first mixer is within 5 minutes, the residence time in the second mixer is at least 2 minutes, and the total residence time is at least 2.5 minutes. Since the first stage mixer must apply a high shear stress of at least $1\times10^6$ $N/m^2$, the residence time through a continuous extrusion mixer wherein the ratio (L/D) of screw length L to screw diameter D is limited is given an upper limit. However, a certain processing time is necessary to ensure shelf stability to the liquid silicone rubber base. Naturally, a long residence time is set in the second stage mixer which carries out mixing at a relatively low shear stress and is relatively free of processing restrictions. The total residence time through the first and second stage mixers is preferably at least 2.5 minutes and more preferably at least 10 minutes, if possible. When the total residence time through both the mixers is at least 2.5 minutes, a liquid silicone rubber base having sufficient shelf stability to minimize a viscosity rise with time can be prepared within a relatively short time as compared with prior art methods. A liquid silicone rubber composition prepared from the base is also shelf stable as compared with prior art ones.

According to the invention, a liquid silicone rubber composition is prepared by blending the thus obtained liquid silicone rubber base with an organohydrogenpolysiloxane and an addition reaction catalyst. The organohydrogenpolysioxane used herein may be selected from those well known for conventional addition reaction type liquid silicone rubber compositions and added in an effective amount for curing. The addition reaction catalyst used herein is typically a platinum series catalyst as is well known in the art. The catalyst is added in a catalytic amount. Any well-known mixing techniques may be used in blending the silicone rubber base with the organohydrogenpolysioxane and the catalyst.

According to the invention, a liquid silicone rubber base having sufficient shelf stability to minimize a viscosity rise with time can be prepared within a relatively short time as compared with prior art methods. Also a liquid silicone rubber composition which exhibits superior cured properties can be prepared from the liquid silicone rubber base.

EXAMPLE

Examples are given below to illustrate the advantages of the invention. All parts are by weight and the viscosity is a measurement at 25° C.

A liquid silicone rubber base was measured for viscosity by means of a Type B rotational viscometer by Tokyo Keiki K.K. before and after heating at 60° C. for 10 days, that is, initial viscosity and viscosity at 60° C./10 days. A silicone rubber composition was prepared from the base and cured into a rubber sheet, which was measured for hardness by means of a Type A spring hardness tester according to JIS K-6301. A dumbbell No. 2 specimen was punched out of the cured rubber sheet and measured for tensile strength and elongation by means of a tensile tester by Ueshima Mfg. K.K.

Example 1

A liquid silicone rubber base was prepared by blending 60 parts of a linear dimethylpolysiloxane blocked with a methylvinylsilyl group at each end of its molecular chain having a viscosity of 10,000 centistokes as a base component, 40 parts of silica powder Nipsil LP (Nippon Silica K.K.) as a reinforcing filler, 3 parts of hexamethyldisilazane as a mixing assistant, and 1 part of water. Disposed at a first stage was a twin screw continuous mixing extruder in which the revolution of screws and paddles and the clearance between the screws and paddles and the barrel were adjusted to apply a shear stress of about $1\times10^7$ $N/m^2$. The extruder had a screw diameter D of 50 mm and a L/D ratio of 50/1. The extruder defined a mixing section of a length extending from the inlet to the outlet. An upstream portion extending from the inlet to 30% of the length was set at a temperature below 50° C., a succeeding 5% portion at 100° C., a further succeeding 5% portion at 200° C., and the remainder extending to the outlet at 250° C.

Serially disposed at a second stage was a twin screw continuous mixing extruder in which the revolution of screws and paddles and the clearance between the screws and paddles and the barrel were adjusted to apply a shear stress of about $1\times10^5$ $N/m^2$. The extruder had a screw diameter D of 150 mm and a L/D ratio of 10/1. The extruder was kept at 250° C. equal to the downstream portion of the first stage extruder.

The residence time was 1.5 minutes through the first stage extruder and 20 minutes through the second stage extruder. The total residence time was 21.5 minutes.

The liquid silicone rubber base, 110 parts, was diluted with 25 parts of the linear dimethylpolysiloxane blocked with a methylvinylsilyl group at each end of its molecular chain having a viscosity of 10,000 centistokes as the base component, and cooled.

A liquid silicone rubber composition was prepared by blending the liquid silicone rubber base with 4 parts of methylhydrogenpolysiloxane of the formula:

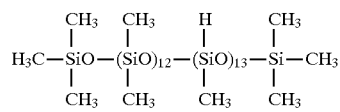

0.3 part of a 2% 2-ethylhexanol solution of chloroplatinic acid, and 0.2 part of ethynyl cyclohexanol as a reaction inhibitor. The composition was cured at 120° C. for 10 minutes into a sheet of 2 mm thick.

Table 1 shows the viscosity behavior of the liquid silicone rubber base and the physical properties of the cured sheet.

Example 2

A liquid silicone rubber base was prepared by blending 60 parts of a linear dimethylpolysiloxane blocked with a methylvinylsilyl group at each end of its molecular chain having a viscosity of 10,000 centistokes as a base component, 40 parts of silica powder Nipsil LP (Nippon Silica K.K.) as a reinforcing filler, 3 parts of hexamethyldisilazane as a mixing assistant, and 1 part of water. Disposed at a first stage was a twin screw continuous mixing extruder in which the revolution of screws and paddles and the clearance between the screws and paddles and the barrel were adjusted to apply a shear stress of about $1\times10^7$ $N/m^2$. The extruder had a screw diameter D of 50 mm and a L/D ratio of 50/1. An upstream portion of the extruder extending from the inlet to 30% of the length was set at a temperature below 50° C., a succeeding 5% portion at 100° C., a further succeeding 5% portion at 200° C., and the remainder extending to the outlet at 250° C.

Serially disposed at a second stage was a twin screw continuous mixing extruder in which the revolution of screws and paddles and the clearance between the screws and paddles and the barrel were adjusted to apply a shear stress of about $1\times10^4$ N/m$^2$. The extruder had a screw diameter D of 150 mm and a L/D ratio of 10/1. The extruder was kept at 250° C. equal to the downstream portion of the first stage extruder.

The residence time was 1.5 minutes through the first stage extruder and 6 minutes through the second stage extruder. The total residence time was 7.5 minutes.

The liquid silicone rubber base, 110 parts, was diluted with 25 parts of the linear dimethylpolysiloxane blocked with a methylvinylsilyl group at each end of its molecular chain having a viscosity of 10,000 centistokes as the base component, and cooled.

A liquid silicone rubber composition was similarly prepared from the liquid silicone rubber base.

The viscosity behavior and physical properties were measured as in Example 1, with the results shown in Table 1.

Example 3

A liquid silicone rubber base was prepared by blending 60 parts of a linear dimethylpolysiloxane blocked with a methylvinylsilyl group at each end of its molecular chain having a viscosity of 10,000 centistokes as a base component, 40 parts of silica powder Nipsil LP (Nippon Silica K.K.) as a reinforcing filler, 3 parts of hexamethyldisilazane as a mixing assistant, and 1 part of water. Disposed at a first stage was a twin screw continuous mixing extruder in which the revolution of screws and paddles and the clearance between the screws and paddles and the barrel were adjusted to apply a shear stress of about $1\times10^4$ N/m$^2$. The extruder had a screw diameter D of 50 mm and a L/D ratio of 50/1. An upstream portion of the extruder extending from the inlet to 30% of the length was set at a temperature below 50° C., a succeeding 5% portion at 100° C., a further succeeding 5% portion at 200° C., and the remainder extending to the outlet at 250° C.

Serially disposed at a second stage was a twin screw continuous mixing extruder in which the revolution of screws and paddles and the clearance between the screws and paddles and the barrel were adjusted to apply a shear stress of about $1\times10^4$ N/m$^2$. The extruder had a screw diameter D of 150 mm and a L/D ratio of 10/1. The extruder was kept at 250° C. equal to the downstream portion of the first stage extruder.

The residence time was 1.5 minutes through the first stage extruder and 20 minutes through the second stage extruder. The total residence time was 21.5 minutes.

The liquid silicone rubber base, 110 parts, was diluted with 25 parts of the linear dimethylpolysiloxane blocked with a methylvinylsilyl group at each end of its molecular chain having a viscosity of 10,000 centistokes as the base component, and cooled.

A liquid silicone rubber composition was similarly prepared from the liquid silicone rubber base.

The viscosity behavior and physical properties were measured as in Example 1, with the results shown in Table 1.

Example 4

A liquid silicone rubber base was prepared by blending 60 parts of a linear dimethylpolysiloxane blocked with a methylvinylsilyl group at each end of its molecular chain having a viscosity of 10,000 centistokes as a base component, 40 parts of silica powder Nipsil LP (Nippon Silica K.K.) as a reinforcing filler, 3 parts of hexamethyldisilazane as a mixing assistant, and 1 part of water. Disposed at a first stage was a twin screw continuous mixing extruder in which the revolution of screws and paddles and the clearance between the screws and paddles and the barrel were adjusted to apply a shear stress of about $1\times10^7$ N/m$^2$. The extruder had a screw diameter D of 50 mm and a L/D ratio of 50/1. An upstream portion of the extruder extending from the inlet to 30% of the length was set at a temperature below 50° C., a succeeding 5% portion at 100° C., a further succeeding 5% portion at 200° C., and the remainder extending to the outlet at 250° C.

Serially disposed at a second stage was a twin screw continuous mixing extruder in which the revolution of screws and paddles and the clearance between the screws and paddles and the barrel were adjusted to apply a shear stress of about $1\times10^5$ N/m$^2$. The extruder had a screw diameter D of 150 mm and a L/D ratio of 10/1. The extruder was kept at 120° C.

The residence time was 1.5 minutes through the first stage extruder and 20 minutes through the second stage extruder. The total residence time was 21.5 minutes.

The liquid silicone rubber base, 110 parts, was diluted with 25 parts of the linear dimethylpolysiloxane blocked with a methylvinylsilyl group at each end of its molecular chain having a viscosity of 10,000 centistokes as the base component, and cooled.

A liquid silicone rubber composition was similarly prepared from the liquid silicone rubber base.

The viscosity behavior and physical properties were measured as in Example 1, with the results shown in Table 1.

Example 5

A liquid silicone rubber base was prepared by blending 60 parts of a linear dimethylpolysiloxane blocked with a methylvinylsilyl group at each end of its molecular chain having a viscosity of 10,000 centistokes as a base component, 40 parts of silica powder Nipsil LP (Nippon Silica K.K.) as a reinforcing filler, 3 parts of hexamethyldisilazane as a mixing assistant, and 1 part of water. Disposed at a first stage was a twin screw continuous mixing extruder in which the revolution of screws and paddles and the clearance between the screws and paddles and the barrel were adjusted to apply a shear stress of about $1\times10^7$ N/m$^2$. The extruder had a screw diameter D of 50 mm and a L/D ratio of 50/1. An upstream portion of the extruder extending from the inlet to 30% of the length was set at a temperature below 50° C., a succeeding 5% portion at 100° C., a further succeeding 5% portion at 200° C., and the remainder extending to the outlet at 250° C.

Serially disposed at a second stage was a twin screw continuous mixing extruder in which the revolution of screws and paddles and the clearance between the screws and paddles and the barrel were adjusted to apply a shear stress of about $1\times10^5$ N/m$^2$. The extruder had a screw diameter D of 150 mm and a L/D ratio of 10/1. The extruder was kept at 250° C. equal to the downstream portion of the first stage extruder.

The residence time was 1.2 minutes through the first stage extruder and 1.2 minutes through the second stage extruder. The total residence time was 2.4 minutes.

The liquid silicone rubber base, 110 parts, was diluted with 25 parts of the linear dimethylpolysiloxane blocked with a methylvinylsilyl group at each end of its molecular chain having a viscosity of 10,000 centistokes as the base component, and cooled.

A liquid silicone rubber composition was similarly prepared from the liquid silicone rubber base.

The viscosity behavior and physical properties were measured as in Example 1, with the results shown in Table 1.

TABLE 1

| Example | Viscosity (poise) of liquid silicone rubber base | | Hardness (JIS A) | Tensile strength (kgf/cm²) | Elongation (%) |
|---|---|---|---|---|---|
| | Initial | 60° C./10 days | | | |
| 1 | 650 | 650 | 40 | 78 | 350 |
| 2 | 700 | 790 | 40 | 75 | 310 |
| 3 | 850 | 980 | 42 | 35 | 190 |
| 4 | 800 | 3000 | 43 | 68 | 300 |
| 5 | 750 | 3200 | 43 | 60 | 280 |

While the invention has been described in what is presently considered to be a preferred embodiment, other variations and modifications will become apparent to those skilled in the art. It is intended, therefore, that the invention not be limited to the illustrative embodiments, but be interpreted within the full spirit and scope of the appended claims.

We claim:

1. A method for preparing a liquid silicone rubber base, comprising the step of mixing an organopolysiloxane containing at least two alkenyl groups attached to a silicon atom in a molecule and having a viscosity of 100 to 300,000 centistokes at 25° C., reinforcing silica having a specific surface area of at least 50 m²/g as measured by the BET method, and optionally, a mixing assistant, the mixing step including a first stage of mixing under a first shear stress of at least $1 \times 10^6$ N/m² and a second stage of mixing under a second shear stress which is up to ½ of the first shear stress.

2. The method of claim 1 wherein the first stage of mixing is partially carried out at a temperature of 150° to 300° C. and the second stage of mixing is partially or entirely carried out at a temperature of 150° to 300° C.

3. The method of claim 1 wherein the first stage of mixing continues for less than 5 minutes, the second stage of mixing continues for at least 2 minutes, and the overall mixing time of the first and second stages is at least 2.5 minutes.

4. The method of claim 1 wherein the first and second stages of mixing are successively and continuously carried out through two serially connected extrusion mixers.

5. A method for preparing a liquid silicone rubber composition, comprising the step of blending the liquid silicone rubber base obtained by the method of claim 1 with an organohydrogenpolysiloxane and an addition reaction catalyst.

6. The method of claim 1, wherein the organopolysiloxane is of the following average compositional formula (1):

$$R_a SiO_{(4-a)/2} \quad (1)$$

wherein R is halogen- or cyano-substituted or unsubstituted monovalent hydrocarbon group of 1 to 12 carbon atoms, at least two R groups being alkenyl groups, and a is a positive number of from 1.8 to 2.2.

7. The method of claim 1, wherein the organopolysiloxane has a linear structure with an alkenyl group at at least one end of its molecular chain.

8. The method of claim 1, wherein the reinforcing silica is fumed silica, precipitated silica, hydrophobic silica or silica powder having silicone oil incorporated therein.

9. The method of claim 1, wherein the amount of reinforcing silica is 5 to 150 parts by weight per 100 parts by weight of organopolysiloxane.

10. The method of claim 1, wherein a mixing assistant is used and it is a hexamethyldisilazane, aqueous ammonia or a compound of the formula (2):

$$\begin{array}{c} R^1 \\ | \\ R^1 SiOH \\ | \\ R^1 \end{array} \quad (2)$$

wherein $R^1$ is a monovalent hydrocarbon group of 1 to 12 carbon atoms, optionally substituted by halogen or cyano, or a triorganosiloxy group.

11. The method of claim 1, wherein the first stage of mixing is conducted with a single-, twin- or multi-screw continuous extrusion kneader.

12. The method of claim 1, wherein the total residence time for both the first and second stages of mixing is at least 10 minutes.

* * * * *